(12) United States Patent
Hui et al.

(10) Patent No.: US 12,199,535 B1
(45) Date of Patent: Jan. 14, 2025

(54) MOTOR ROTATION CONTROL METHOD AND DEVICE

(71) Applicants: SHANGHAI LEEKR TECHNOLOGY CO.LTD., Shanghai (CN); SUZHOU LEEKR TECHNOLOGY CO.LTD., Jiangsu (CN)

(72) Inventors: Zhifeng Hui, Shanghai (CN); Ganting Su, Shanghai (CN); Sheng Zheng, Shanghai (CN); Youkun Li, Shanghai (CN)

(73) Assignees: SHANGHAI LEEKR TECHNOLOGY CO.LTD., Shanghai (CN); SUZHOU LEEKR TECHNOLOGY CO. LTD., Suzhou (CN)

( * ) Notice: Subject to any disclaimer, the term of this patent is extended or adjusted under 35 U.S.C. 154(b) by 0 days.

(21) Appl. No.: 18/609,668

(22) Filed: Mar. 19, 2024

Related U.S. Application Data

(63) Continuation of application No. PCT/CN2023/138204, filed on Dec. 12, 2023.

(30) Foreign Application Priority Data

Sep. 25, 2023 (CN) .......................... 202311240261.6

(51) Int. Cl.
*H02P 21/18* (2016.01)
*H02P 6/24* (2006.01)
(Continued)

(52) U.S. Cl.
CPC ................ *H02P 21/18* (2016.02); *H02P 6/24* (2013.01); *H02P 21/22* (2016.02);
(Continued)

(58) Field of Classification Search
CPC .. H02P 21/18; H02P 6/24; H02P 21/22; H02P 2103/20; H02P 2205/01; H02P 2205/00; H02P 7/0667; H02P 25/186
See application file for complete search history.

(56) References Cited

U.S. PATENT DOCUMENTS

2014/0265968 A1* 9/2014 Melanson ............... H02P 21/22
318/400.32

FOREIGN PATENT DOCUMENTS

| CN | 114553100 A | 5/2022 | |
| CN | 115840402 A | 3/2023 | |
| JP | 2017229237 A * | 12/2017 | ............. H02P 21/06 |

* cited by examiner

*Primary Examiner* — Bickey Dhakal
(74) *Attorney, Agent, or Firm* — MUNCY, GEISSLER, OLDS & LOWE, P.C.

(57) ABSTRACT

A technical field of motor control, and a motor rotation control method and device. The method includes conducting inverse Park transformation and inverse Clark transformation to control output results of a position loop, a speed loop and a current loop to obtain SVPWM signals of a present cycle; decoupling an interrupt control cycle from a PWM signal reference channel; acquiring present position sampling information of a motor, and predicting the position sampling information to obtain position result information of a motor rotor in predicted cycles. In the motor rotation control method, an interrupt function trigger signal is added to realize decoupling from the PWM signal reference channel, so that SVPWM signal update frequency of motor control will not be affected when CPU load is reduced by adding an interrupt function scheduling cycle.

12 Claims, 6 Drawing Sheets

(51) Int. Cl.
*H02P 21/22* (2016.01)
*H02P 103/20* (2016.01)
(52) U.S. Cl.
CPC ...... *H02P 2103/20* (2015.01); *H02P 2205/01* (2013.01); *H02P 2205/07* (2013.01)

| In a first interrupt cycle, acquiring first position sampling information of a motor, and conducting position loop calculation to the first position sampling information of the motor to obtain a first control output result | ~S101 |

↓

| In a second interrupt cycle, receiving the first control output result obtained from the calculation in the first interrupt cycle, and conducting speed loop calculation to the first control output result to obtain a second control output result | ~S102 |

↓

| In a third interrupt cycle, receiving the second control output result obtained from the calculation in the second interrupt cycle, and conducting current loop calculation to the second control output result to obtain a third control output result | ~S103 |

↓

| In a fourth interrupt cycle, receiving the third control output result obtained from the calculation in the third interrupt cycle, and conducting inverse Park transformation and inverse Clark transformation to the third control output result to obtain SVPWM signals of a present cycle; the first interrupt cycle, the second interrupt cycle, the third interrupt cycle and the fourth interrupt cycle constitute an interrupt control cycle, and the interrupt control cycle is decoupled from a PWM signal reference channel | ~S104 |

↓

| In the fourth interrupt cycle, acquiring present second position sampling information of the motor, and predicting the second position sampling information to obtain position result information of a motor rotor in a preset number of predicted cycles; conducting inverse Park transformation and inverse Clark transformation to the position result information to obtain SVPWM signals of the preset number of predicted cycles | ~S105 |

↓

| Generating an SVPWM control signal group according to the SVPWM signals of the present cycle and the SVPWM signals of the preset number of predicted cycles, and controlling the motor according to the SVPWM control signal group | ~S106 |

FIG. 1

MOTOR ROTATION CONTROL METHOD AND DEVICE

CROSS REFERENCE TO RELATED APPLICATIONS

This application is a Continuation of the U.S. National Stage of International Application No. PCT/CN2023/138204 filed on Dec. 12, 2023, which claims priority to Chinese Patent Application No. 202311240261.6 on filed Sep. 25, 2023 under 35 U.S.C. § 119; the entire contents of all of which are hereby incorporated by reference.

TECHNICAL FIELD

The present application relates to the technical field of motor control, and particularly relates to a motor rotation control method and device.

BACKGROUND

Permanent magnet synchronous motor control is widely used, such as in automotive driving motors, electric power steering motors and automotive brake motors. Controllers of such motors generally require high functional safety level and product reliability, and usually use a mature and reliable software architecture. AUTOSAR is a mature, reliable and widely used architecture, and has become a trend. By purchasing COTS software of AUTOSAR architecture which meets functional safety requirements, desired codes meeting the functional safety requirements are generated through configuration. At the same time, a motor controller itself will be added with a lot of safety mechanisms to meet the functional safety requirements. This undoubtedly increases code complexity and software execution time.

For existing motor control methods, a traditionally adopted way is that an interrupt trigger signal and a PWM signal reference channel are the same signal, so that a control cycle of a motor and a cycle of PWM signals are consistent. For example, if the cycle of PWM signals of motor control is 50 μs, then the execution cycle of an interrupt function is also 50 μs. If CPU load of the motor controller is high, reducing the load at this time can only lengthen the cycles of both the PWM signals of motor control and the PWM signals of interrupt trigger, and the longer cycles of the PWM signals will affect NVH.

Traditional three-closed-loop control of motor FOC control is based on establishing three Tasks or interrupts for a three-closed-loop system, which are a position loop control function, a speed loop control function and a current loop function, respectively. As the three functions belong to different Tasks or interrupts, problems of execution priority and function nesting of the three functions will certainly exist. In addition, in this process, an ECU usually has other interrupts and Tasks which intersperse or block the chronology and phase of the functions of the three-loop control system; for a real-time control system of the motor, in the process of Task interruption or nesting execution, a value of a three-loop control operation result may not be the latest value or a control order is not executed in the desired order, thus control effect is affected; what's more, the CPU load thereof is generally large. Therefore, the technical problem to be urgently solved by those skilled in the art is to design a motor rotation control method.

SUMMARY

In view of the defects, an embodiment of the present application discloses a motor rotation control method which can reduce CPU load without affecting SVPWM signal update frequency of motor control.

In a first aspect, the embodiment of the present application discloses a motor rotation control method, comprising:

In a first interrupt cycle, acquiring first position sampling information of a motor, and conducting position loop calculation to the first position sampling information of the motor to obtain a first control output result;

In a second interrupt cycle, receiving the first control output result obtained from the calculation in the first interrupt cycle, and conducting speed loop calculation to the first control output result to obtain a second control output result;

In a third interrupt cycle, receiving the second control output result obtained from the calculation in the second interrupt cycle, and conducting current loop calculation to the second control output result to obtain a third control output result;

In a fourth interrupt cycle, receiving the third control output result obtained from the calculation in the third interrupt cycle, and conducting inverse Park transformation and inverse Clark transformation to the third control output result to obtain SVPWM signals of a present cycle; the first interrupt cycle, the second interrupt cycle, the third interrupt cycle and the fourth interrupt cycle constitute an interrupt control cycle, and the interrupt control cycle is decoupled from a PWM signal reference channel;

In the fourth interrupt cycle, acquiring present second position sampling information of the motor, and predicting the second position sampling information to obtain position result information of a motor rotor in a preset number of predicted cycles; conducting inverse Park transformation and inverse Clark transformation to the position result information to obtain SVPWM signals of the preset number of predicted cycles;

Generating an SVPWM control signal group according to the SVPWM signals of the present cycle and the SVPWM signals of the preset number of predicted cycles, and controlling the motor according to the SVPWM control signal group.

As an optional embodiment, in the first aspect of the embodiment of the present application, the steps of "acquiring first position sampling information of a motor, and conducting position loop calculation to the first position sampling information of the motor to obtain a first control output result" comprise:

Acquiring the position sampling information of the motor in the first interrupt cycle;

Processing the position sampling information of the motor in the first interrupt cycle to obtain an actual position of the motor rotor and an actual rotation speed of the motor rotor;

Conducting closed-loop control to a position of the motor to obtain the first control output result according to a target position of a motor control input and the actual position of the motor rotor;

The steps of "receiving the first control output result obtained from the calculation in the first interrupt cycle, and conducting speed loop calculation to the first control output result to obtain a second control output result" comprise:

Receiving the first control output result and the actual rotation speed of the motor rotor obtained from the calculation in the first interrupt cycle;

Conducting closed-loop control calculation to a target speed of the motor to obtain the second control output result;

The steps of "receiving the second control output result obtained from the calculation in the second interrupt cycle, and conducting current loop calculation to the second control output result to obtain a third control output result" comprise:

Sampling phase currents of the motor to obtain the phase currents Ia and Ic;

Conducting Clark and Park transformation to the phase currents Ia and Ic to obtain a direct-axis (d-axis) current Id and a quadrature-axis (q-axis) current Iq; an electrical angle of a quadrature axis ahead of a direct axis is 90 degrees;

Receiving the second control output result obtained from the calculation in the second interrupt cycle, and conducting closed-loop control to the d-axis current Id and the q-axis current Iq to obtain the third control output result;

The steps of "receiving the third control output result obtained from the calculation in the third interrupt cycle, and conducting inverse Park transformation and inverse Clark transformation to the third control output result to obtain SVPWM signals of a present cycle" comprise:

Acquiring the position sampling information of the motor in the fourth interrupt cycle;

Processing the position sampling information of the motor in the fourth interrupt cycle to obtain an actual position of the motor rotor and a rotation speed of the motor rotor;

Receiving the third control output result obtained from the calculation in the third interrupt cycle, and conducting inverse Park transformation and inverse Clark transformation to the third control output result to obtain SVPWM signals of a present cycle;

The steps of "acquiring present second position sampling information of the motor, and predicting the second position sampling information to obtain position result information of a motor rotor in a preset number of predicted cycles; conducting inverse Park transformation and inverse Clark transformation to the position result information to obtain SVPWM signals of the preset number of predicted cycles" comprise:

Acquiring the rotation speed and the position of the motor in the fourth interrupt cycle;

Predicting the position of the motor rotor in the first interrupt cycle, the position of the motor rotor in the second interrupt cycle and the position of the motor rotor in the third interrupt cycle of a next stage according to the rotation speed and the position of the motor in the fourth interrupt cycle;

Conducting inverse Park transformation and inverse Clark transformation to output results in the first interrupt cycle, the second interrupt cycle and the third interrupt cycle of the next stage, respectively, to obtain corresponding SVPWM signals of a position loop, a speed loop and a current loop of the next stage.

As an optional embodiment, in the first aspect of the embodiment of the present application, priority of the interrupt control cycle is configured to be the highest level for application program class interrupts.

In specific implementation, the priority of the interrupt control cycle is configured to be very high in order not to be disturbed by other interrupts or application program tasks; general interrupts are divided into Class I interrupts and Class II interrupts, whereas the application program class interrupts here are the Class II interrupts, and the Class I interrupts are generally system-level settings; herein, it is only necessary to configure the priority to be the highest level for application program class interrupts to realize corresponding three-closed-loop control disassembly.

As an optional embodiment, in the first aspect of the embodiment of the present application, the method also comprises the following steps after generating an SVPWM control signal group according to the SVPWM signals of the present cycle and the SVPWM signals of the preset number of predicted cycles:

Repeating the above step and generating a corresponding sequence index number for the SVPWM control signal group obtained; storing the corresponding SVPWM control signal group and the sequence index number associatively;

Each time a new interrupt control cycle is entered, acquiring the SVPWM control signal group associated with the new interrupt control cycle according to the corresponding sequence index number in order to conduct subsequent motor control.

A whole control sequence is generated sequentially and executed circularly. Each time when an interrupt function is entered, a corresponding group of SVPWM control signals are indexed and updated according to the sequence number of the interrupt function entered, and act on a motor drive bridge circuit. In this way, the SVPWM signal update frequency of motor control will not be affected due to the reduction of the CPU load.

As an optional embodiment, in the first aspect of the embodiment of the present application, the motor rotation control method also comprises:

Acquiring present load running information of a CPU;

Comparing the load running information with a preset load; if the load information is greater than the preset load, increasing the size of the interrupt control cycle until the load running information of the CPU is less than the preset load.

Herein, a load running state of the CPU is detected in real time and compared with the preset load to determine whether the CPU is running within a reasonable range. If the present running load of the CPU is too high, the size of the interrupt control cycle is increased to reduce the running load.

As an optional embodiment, in the first aspect of the embodiment of the present application, the motor rotation control method also comprises:

Acquiring AD signal sampling trigger time $T_1$ and interrupt trigger time $T_2$ by a time acquisition module;

Acquiring a present rotation speed $\omega$ of the motor;

Calculating predicted position information of the motor rotor according to the AD signal sampling trigger time $T_1$, the interrupt trigger time $T_2$, the present rotation speed $\omega$ and a position compensation formula, and generating SVPWM signals; the position compensation formula is: $\theta_2 = \theta_1 + \omega*(T_2 - T_1 + n*T)$, wherein n is the difference between the number of a control cycle generating predicted PWM signals and the number of a present control cycle, T is the cycle time of motor control, $\omega$ is the present rotation speed of the motor, $T_2$ is the interrupt trigger time, $T_1$ is the AD signal trigger time, $\theta_1$ is the angle calculated after AD sampling at the position of the motor rotor in the current cycle, and $\theta_2$ is the position of the motor rotor predicted in a corresponding control cycle.

Since the interrupt control cycle is decoupled from a PWM signal reference channel cycle, i.e., a time difference between the moment when an interrupt control function is entered and the moment when the AD sampling of the motor driven SVPWM signals is triggered is random, in order to realize better signal synchronization, it is necessary to conduct angle compensation to realize more accurate motor control in specific implementation.

As an optional embodiment, in the first aspect of the embodiment of the present application, the preset number is 3.

In a second aspect, the embodiment of the present application discloses a motor rotation control device, comprising:

A position loop calculation module: used for, in a first interrupt cycle, acquiring first position sampling information of a motor, and conducting position loop calculation to the first position sampling information of the motor to obtain a first control output result;

A speed loop calculation module: used for, in a second interrupt cycle, receiving the first control output result obtained from the calculation in the first interrupt cycle, and conducting speed loop calculation to the first control output result to obtain a second control output result;

A current loop calculation module: used for, in a third interrupt cycle, receiving the second control output result obtained from the calculation in the second interrupt cycle, and conducting current loop calculation to the second control output result to obtain a third control output result;

A PWM calculation module: used for, in a fourth interrupt cycle, receiving the third control output result obtained from the calculation in the third interrupt cycle, and conducting inverse Park transformation and inverse Clark transformation to the third control output result to obtain SVPWM signals of a present cycle; the first interrupt cycle, the second interrupt cycle, the third interrupt cycle and the fourth interrupt cycle constitute an interrupt control cycle, and the interrupt control cycle is decoupled from a PWM signal reference channel;

A signal prediction module: used for, in the fourth interrupt cycle, acquiring present second position sampling information of the motor, and predicting the second position sampling information to obtain position result information of a motor rotor in a preset number of predicted cycles; conducting inverse Park transformation and inverse Clark transformation to the position result information to obtain SVPWM signals of the preset number of predicted cycles;

A motor control module: used for generating an SVPWM control signal group according to the SVPWM signals of the present cycle and the SVPWM signals of the preset number of predicted cycles, and controlling the motor according to the SVPWM control signal group.

As an optional embodiment, in the secondary aspect of the embodiment of the present application, priority of the interrupt control cycle is configured to be the highest level for application program class interrupts.

In a third aspect, the embodiment of the present application discloses an electronic device, comprising a memory which stores executable program codes and a processor which is coupled to the memory; the executable program codes stored in the memory are invoked by the processor to execute the motor rotation control method disclosed in the first aspect of the embodiment of the present application.

In a fourth aspect, the embodiment of the present application discloses a computer readable storage medium, wherein a computer program is stored in the computer readable storage medium, and the computer program enables a computer to execute the motor rotation control method disclosed in the first aspect of the embodiment of the present application.

Compared with the prior art, the embodiment of the present application has the following beneficial effects:

In the motor rotation control method of the embodiment of the present application, an interrupt function trigger signal is added to realize decoupling from the PWM signal reference channel, so that SVPWM signal update frequency of motor control will not be affected when CPU load is reduced by adding an interrupt function scheduling cycle.

DESCRIPTION OF DRAWINGS

To more clearly describe the technical solutions in the embodiments of the present application, the drawings required to be used in the embodiments will be simply presented below. Apparently, the drawings in the following description are merely some embodiments of the present application, and for those skilled in the art, other drawings can also be obtained according to these drawings without contributing creative labor.

FIG. 1 is a flow chart of a motor rotation control method disclosed in an embodiment of the present application;

DETAILED DESCRIPTION

Figure 2:
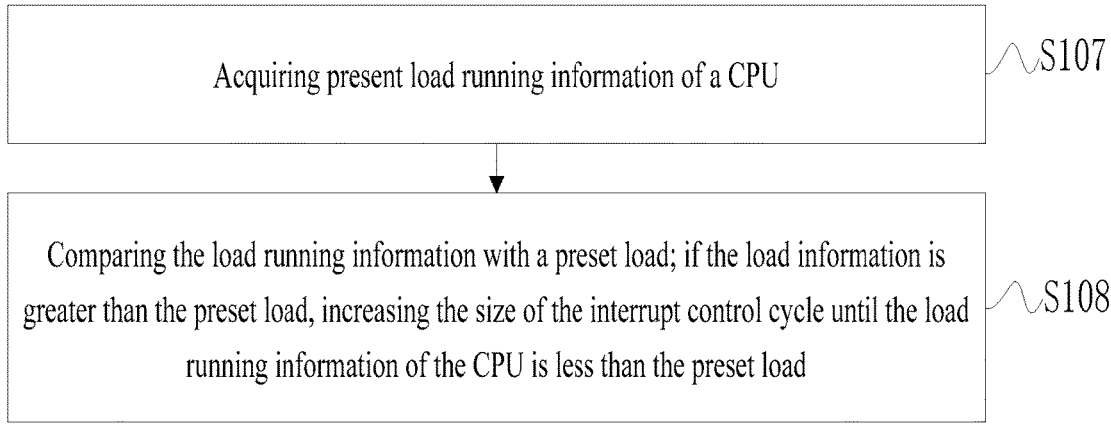
FIG. 2 is a flow chart of automatic adjustment of an interrupt control cycle disclosed in an embodiment of the present application.

The technical solution in the embodiments of the present application will be clearly and fully described below in combination with the drawings in the embodiments of the present application. Apparently, the described embodiments are merely part of the embodiments of the present application, not all of the embodiments. Based on the embodiments in the present application, all other embodiments obtained by those ordinary skilled in the art without contributing creative labor will belong to the protection scope of the present application.

It should be noted that the terms such as "first", "second", "third", "fourth" and the like in the description and claims in the present application are used for distinguishing different objects rather than used for describing a special order. Terms of "comprise" and "have" as well as any other variant in the embodiments of the present application are intended to cover non-exclusive inclusion, for example, processes, methods, systems, products or devices including a series of steps or units are not limited to those steps or units clearly listed, but include other steps or units that are not listed clearly or are inherent to these processes, methods, products or devices.

Traditional three-closed-loop control of motor FOC control is based on establishing three Tasks or interrupts for a three-closed-loop system, which are a position loop control function, a speed loop control function and a current loop function, respectively. As the three functions belong to different Tasks or interrupts, problems of execution priority and function nesting of the three functions will certainly exist. In addition, in this process, an ECU usually has other interrupts and Tasks which intersperse or block the chronology and phase of the functions of the three-loop control system; for a real-time control system of the motor, in the process of Task interruption or nesting execution, a value of a three-loop control operation result may not be the latest value or a control order is not executed in the desired order, thus control effect is affected; what's more, the CPU load thereof is generally large. Based on this, the embodiments of the present application disclose a motor rotation control method, device, electronic device and storage medium, wherein an interrupt function trigger signal is added to realize decoupling from the PWM signal reference channel, so that SVPWM signal update frequency of motor control will not be affected when CPU load is reduced by adding an interrupt function scheduling cycle.

Embodiment 1

Referring to FIG. 1, FIG. 1 is a flow chart of a motor rotation control method disclosed in an embodiment of the present application. An executive body of the method in the embodiment of the present application is composed of software or/and hardware, which can receive relevant information in a wired or/and wireless mode and send certain instructions. Of course, the executive body can also have certain processing and storage functions. The executive body can control multiple devices, such as a remote physical server or cloud server and related software, or a local host or server and related software that perform related operations on a device located somewhere. In some scenarios, the executive body can also control multiple storage devices, and the storage devices can be placed in the same place or in different places. As shown in FIG. 1, the motor rotation control method comprises the following steps:

S101: in a first interrupt cycle, acquiring first position sampling information of a motor, and conducting position loop calculation to the first position sampling information of the motor to obtain a first control output result;

S102: in a second interrupt cycle, receiving the first control output result obtained from the calculation in the first interrupt cycle, and conducting speed loop calculation to the first control output result to obtain a second control output result;

S103: in a third interrupt cycle, receiving the second control output result obtained from the calculation in the second interrupt cycle, and conducting current loop calculation to the second control output result to obtain a third control output result;

S104: in a fourth interrupt cycle, receiving the third control output result obtained from the calculation in the third interrupt cycle, and conducting inverse Park transformation and inverse Clark transformation to the third control output result to obtain SVPWM signals of a present cycle; the first interrupt cycle, the second interrupt cycle, the third interrupt cycle and the fourth interrupt cycle constitute an interrupt control cycle, and the interrupt control cycle is decoupled from a PWM signal reference channel; the interrupt control cycle here is a complete motor FOC control cycle;

S105: in the fourth interrupt cycle, acquiring present second position sampling information of the motor, and predicting the second position sampling information to obtain position result information of a motor rotor in a preset number of predicted cycles; conducting inverse Park transformation and inverse Clark transformation to the position result information to obtain SVPWM signals of the preset number of predicted cycles;

S106: generating an SVPWM control signal group according to the SVPWM signals of the present cycle and the SVPWM signals of the preset number of predicted cycles, and controlling the motor according to the SVPWM control signal group.

More preferably, the steps of "acquiring first position sampling information of a motor, and conducting position loop calculation to the first position sampling information of the motor to obtain a first control output result" comprise:

Acquiring the position sampling information of the motor in the first interrupt cycle;

Processing the position sampling information of the motor in the first interrupt cycle to obtain an actual position of the motor rotor and an actual rotation speed of the motor rotor;

Conducting closed-loop control to a position of the motor to obtain the first control output result according to a target position of a motor control input and the actual position of the motor rotor;

The steps of "receiving the first control output result obtained from the calculation in the first interrupt cycle, and conducting speed loop calculation to the first control output result to obtain a second control output result" comprise:

Receiving the first control output result and the actual rotation speed of the motor rotor obtained from the calculation in the first interrupt cycle;

Conducting closed-loop control calculation to a target speed of the motor to obtain the second control output result;

The steps of "receiving the second control output result obtained from the calculation in the second interrupt cycle, and conducting current loop calculation to the second control output result to obtain a third control output result" comprise:

Sampling phase currents of the motor to obtain the phase currents Ia and Ic;

Conducting Clark and Park transformation to the phase currents Ia and Ic to obtain a direct-axis (d-axis) current Id and a quadrature-axis (q-axis) current Iq; an electrical angle of a quadrature axis ahead of a direct axis is 90 degrees;

Receiving the second control output result obtained from the calculation in the second interrupt cycle, and conducting closed-loop control to the d-axis current Id and the q-axis current Iq to obtain the third control output result;

The steps of "receiving the third control output result obtained from the calculation in the third interrupt cycle, and conducting inverse Park transformation and inverse Clark transformation to the third control output result to obtain SVPWM signals of a present cycle" comprise:

Acquiring the position sampling information of the motor in the fourth interrupt cycle;

Processing the position sampling information of the motor in the fourth interrupt cycle to obtain an actual position of the motor rotor and a rotation speed of the motor rotor;

Receiving the third control output result obtained from the calculation in the third interrupt cycle, and conducting inverse Park transformation and inverse Clark transformation to the third control output result to obtain SVPWM signals of a present cycle;

The steps of "acquiring present second position sampling information of the motor, and predicting the second position sampling information to obtain position result information of a motor rotor in a preset number of predicted cycles; conducting inverse Park transformation and inverse Clark transformation to the position result information to obtain SVPWM signals of the preset number of predicted cycles" comprise:

Acquiring the rotation speed and the position of the motor in the fourth interrupt cycle;

Predicting the position of the motor rotor in the first interrupt cycle, the position of the motor rotor in the second interrupt cycle and the position of the motor rotor in the third interrupt cycle of a next stage according to the rotation speed and the position of the motor in the fourth interrupt cycle;

Conducting inverse Park transformation and inverse Clark transformation to output results in the first interrupt cycle, the second interrupt cycle and the third interrupt cycle of the next stage, respectively, to obtain corresponding SVPWM signals of a position loop, a speed loop and a current loop of the next stage.

Figure 4:
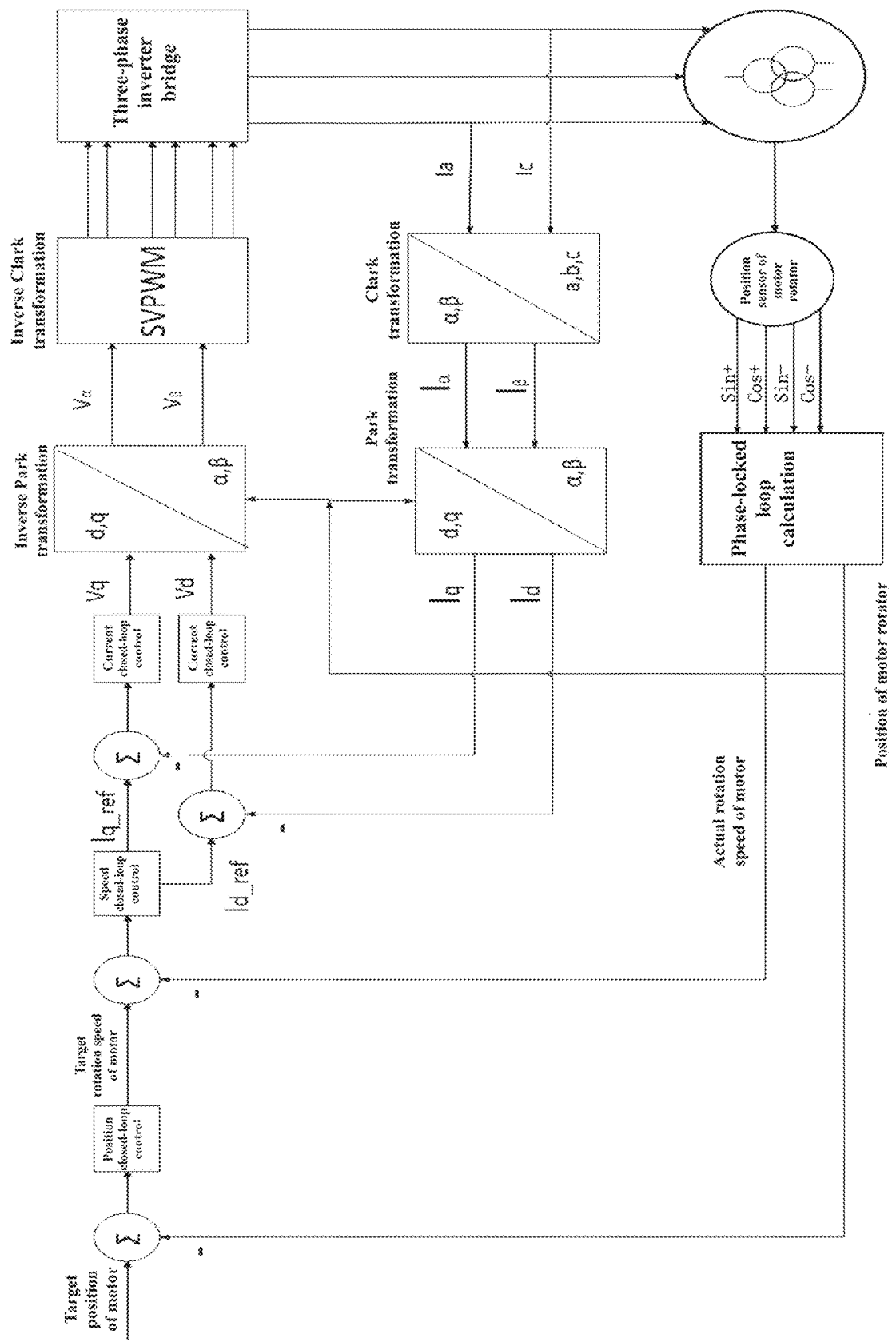
FIG. 4 is a schematic block diagram of motor FOC control disclosed in an embodiment of the present application.
Figure 5:
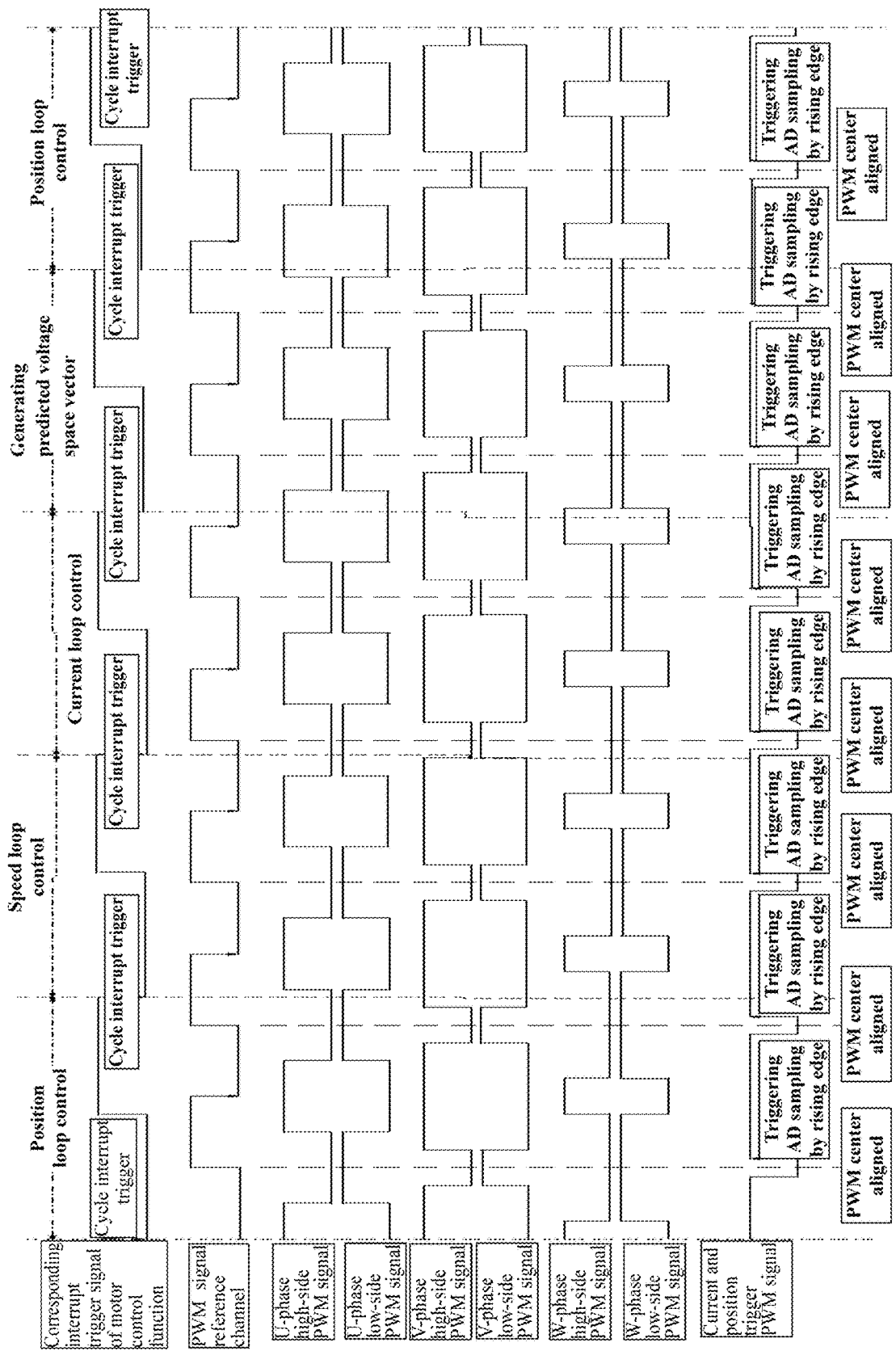
FIG. 5 is a schematic diagram showing a driving relation between interrupts and motor PWM disclosed in an embodiment of the present application.

FIG. 4 is a schematic block diagram of motor FOC control disclosed in an embodiment of the present application. A position sensor of the motor rotor is located near the motor; when the motor rotor rotates, four analog voltage signals of Sin+, Cos+, Sin− and Cos− will be output by the position sensor of the motor rotor; after AD sampling and normalization of the analog voltage signals, a position signal of the motor rotor and a rotation speed signal of the motor rotor are obtained after phase-locked loop operation processing. A sampling resistor is arranged on a three-phase inverter bridge of the motor; when a current flows through the resistor, voltage analog signals are generated; the signals are subject to AD sampling and converted into the phase currents Ia and Ic. The phase currents are subject to Clark coordinate transformation to obtain current signals Iα and Iβ, and the current signals are subject to Park coordinate transformation to obtain actual d-axis current signal Id and q-axis current signal Iq in combination with the position signal of the motor rotor. When the target position of the motor rotor is requested by a controller, position closed-loop control is conducted by the software according to an actual position signal obtained by phase-locked loop calculation. An output result of the position closed-loop control is a target rotation speed of the motor rotor requested, and speed closed-loop control is conducted by the software according to the actual rotation speed obtained by phase-locked loop calculation. D-axis target current Id_ref and q-axis target current Iq_ref are output by the speed closed-loop control, and target current control of d-axis and q-axis is carried out, respectively, in combination with the actual Id and Iq obtained by Park coordinate transformation. Vd is obtained by the target current control of d-axis, and Vq is obtained by the target current control of q-axis. Vd and Vq are subject to inverse Park coordinate transformation to obtain Vα and Vβ in combination with the position signal of the motor rotor, Vα and Vβ are subject to inverse Clark transformation to obtain a space vector pulse width modulation (SVPWM) signal, and the signal acts on the inverter bridge of the motor to drive the motor to rotate.

Six PWM signals of motor control and a PWM signal of motor current and rotor position triggered sampling are generated by a PWM module of a main chip of the motor controller in the embodiment of the present application. The seven PWM signals are usually in a same module, and are all center aligned based on the PWM signal reference channel and based on a same clock source; in addition, an interrupt trigger signal is also generated, which is used to realize an interrupt function. In the interrupt function, the three-loop control of the position loop, the speed loop and the current loop of the motor is realized. In a usual FOC algorithm module, the control output result of the position loop is used as control input of the speed loop, the control output result of the speed loop is corresponding to control input of the current loop, the output of the current loop is corresponding to reference voltage signals of the d-axis and the q-axis, and the space vector PWM signals are generated by the reference voltage signals through inverse Park transformation and inverse Clarke transformation. In some practical applications, it may be directly from speed loop control to current loop control, or from position loop control to current loop control, or a combination of the two, but the disassembly will not be affected.

In a traditional method, an interrupt trigger signal and a PWM signal reference channel are the same signal, so that a control cycle of a motor and a cycle of PWM signals are consistent. For example, if the cycle of PWM signals of motor control is 50 μs, then the execution cycle of an interrupt function is also 50 μs. If CPU load of the motor controller is high, reducing the load at this time can only lengthen the cycles of both the PWM signals of motor control and the PWM signals of interrupt trigger, and the longer cycles of the PWM signals will affect NVH (Noise, Vibration and Harshness). Herein, a trigger signal is added to generate a new interrupt function, and the trigger signal of the new interrupt function is decoupled from the PWM signal reference channel. That is, the frequency of the new interrupt trigger signal can be lowered, such as 10 KHz, 16 KHz, etc., and can also be the same as that of the PWM reference channel, whereas the frequency of the six PWM signals of motor control can still be 20 KHz.

Due to system inertia, in a very short time of the four control cycles of the closed-loop system of the motor, it is generally believed that the output of the position loop, the speed loop and the current loop almost does not play a leading role, i.e., it is considered that the control output results of the three loops (reference voltages of the d-axis and the q-axis) do not change much. However, the position of the motor rotor will change in the control process of the motor, and the change is significantly important for the motor to generate SVPWM signals. Therefore, the position of the motor rotor in the present cycle can be calculated according to present Sin and Cos signals of the motor rotor, and the position of the motor rotor in the next three cycles can be predicted according to the rotation speed of the motor rotor (the rotation speed can generally be obtained by arctan of Sin/Cos signals or phase-locked loop processing of the Sin and Cos signals, which will not be repeated here in details). Then the corresponding SVPWM signals of the present cycle and the subsequent three cycles are obtained according to inverse Park transformation and inverse Clark transformation. Each time when an interrupt function is entered, corresponding SVPWM signals at this time will be updated, and act on a motor drive bridge; stable control of the motor can be realized by the above method.

More preferably, priority of the interrupt control cycle is configured to be the highest level for application program class interrupts.

In specific implementation, the priority of the interrupt control cycle is configured to be very high in order not to be disturbed by other interrupts or application program tasks; general interrupts are divided into Class I interrupts and Class II interrupts, whereas the application program class interrupts here are the Class II interrupts, and the Class I interrupts are generally system-level settings; herein, it is only necessary to configure the priority to be the highest level for application program class interrupts to realize corresponding three-closed-loop control disassembly.

In the embodiment of the present application, first, the priority of the interrupt function is set to be very high in order not to be disturbed by other interrupts or Tasks, and then the three-closed-loop control is disassembled, i.e., the motor control is decomposed to be realized in four control cycles, and the interrupt function is entered once in each control cycle. That is, the interrupt function is entered for the first time to realize position loop control, the interrupt function is entered for the second time to realize speed loop control, the interrupt function is entered for the third time to realize current loop control, and the interrupt function is entered for the fourth time to realize generation of a SVPWM control signal sequence with four groups of predicted voltage space vectors, wherein one group is the SVPWM control signals of the present control cycle, and the other three groups are the SVPWM control signals of subsequent three control cycles. The whole control sequence is repeated like this and executed circularly. Each time when an interrupt function is entered, a corresponding group of SVPWM control signals are indexed and updated according to the sequence number of the interrupt function entered, and act on a motor drive bridge circuit. In this way, the SVPWM signal update frequency of motor control will not be affected due to the reduction of the CPU load.

More preferably, the method also comprises the following steps after generating an SVPWM control signal group according to the SVPWM signals of the present cycle and the SVPWM signals of the preset number of predicted cycles:
Repeating the above step and generating a corresponding sequence index number for the SVPWM control signal group obtained; storing the corresponding SVPWM control signal group and the sequence index number associatively;
Each time a new interrupt control cycle is entered, acquiring the SVPWM control signal group associated with the new interrupt control cycle according to the corresponding sequence index number in order to conduct subsequent motor control.

A whole control sequence is generated sequentially and executed circularly. Each time when an interrupt function is entered, a corresponding group of SVPWM control signals are indexed and updated according to the sequence number of the interrupt function entered, and act on a motor drive bridge circuit. In this way, the SVPWM signal update frequency of motor control will not be affected due to the reduction of the CPU load.

More preferably, FIG. 2 is a flow chart of automatic adjustment of an interrupt control cycle disclosed in an embodiment of the present application. As shown in FIG. 2, the motor rotation control method also comprises:

S107: acquiring present load running information of a CPU;

S108: comparing the load running information with a preset load; if the load information is greater than the preset load, increasing the size of the interrupt control cycle until the load running information of the CPU is less than the preset load.

In specific implementation, the control cycle here can either be set in advance or dynamically adjusted. Herein, a load running state of the CPU is detected in real time and compared with the preset load to determine whether the CPU is running within a reasonable range. If the present running load of the CPU is too high, the size of the interrupt control cycle is increased to reduce the running load.

Figure 3:
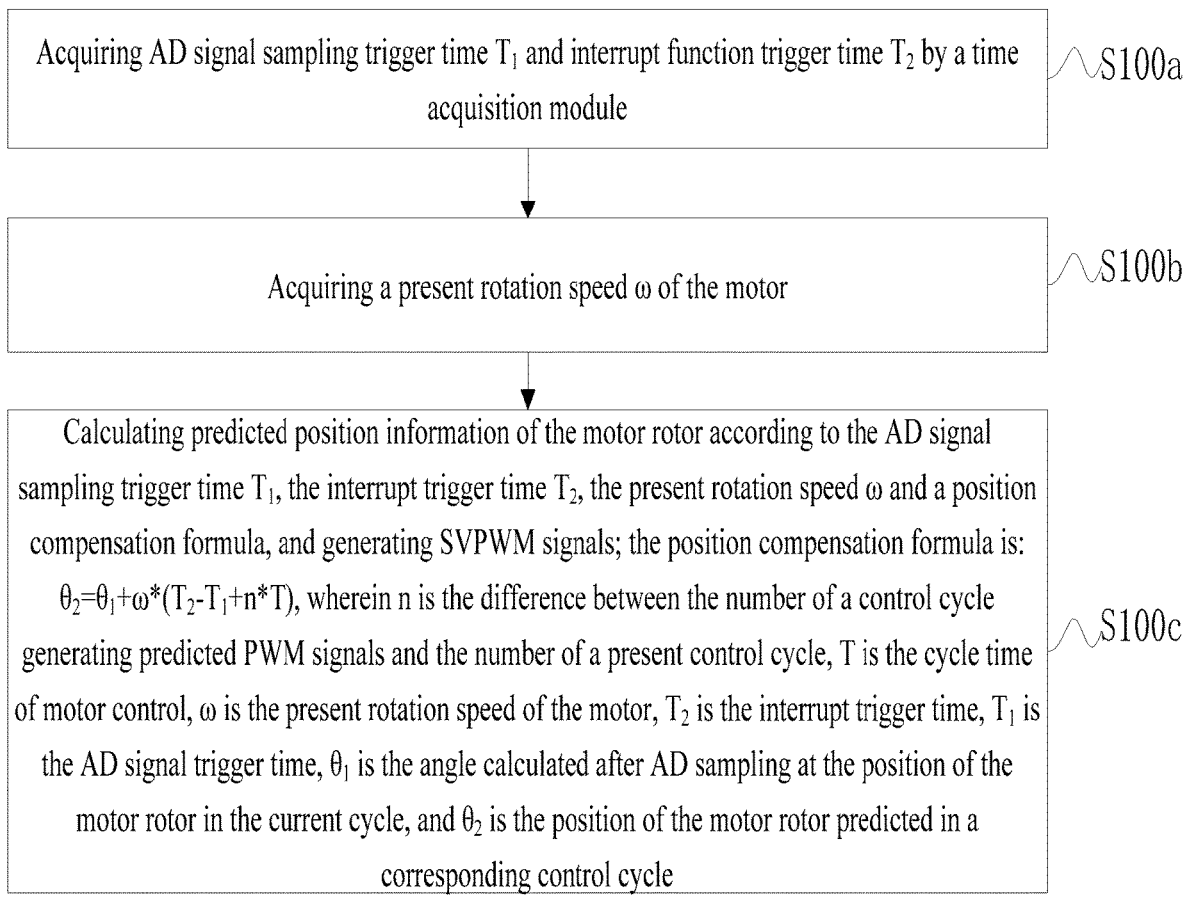
FIG. 3 is a flow chart of angle compensation calculation disclosed in an embodiment of the present application.

More preferably, FIG. 3 is a flow chart of angle compensation calculation disclosed in an embodiment of the present application. As shown in FIG. 3, the motor rotation control method also comprises:

S100a: acquiring AD signal sampling trigger time $T_1$ and interrupt trigger time $T_2$ by a time acquisition module;

S100b: acquiring a present rotation speed $\omega$ of the motor;

S100c: calculating predicted position information of the motor rotor according to the AD signal sampling trigger time $T_1$, the interrupt trigger time $T_2$, the present rotation speed $\omega$ and a position compensation formula, and generating SVPWM signals; the position compensation formula is: $\theta_2=\theta_1+\omega*(T_2-T_1+n*T)$, wherein n is the difference between the number of a control cycle generating predicted PWM signals and the number of a present control cycle, T is the cycle time of motor control, $\omega$ is the present rotation speed of the motor, $T_2$ is the interrupt trigger time, $T_1$ is the AD signal trigger time, $\theta_1$ is the angle calculated after AD sampling at the position of the motor rotor in the current cycle, and $\theta_2$ is the position of the motor rotor predicted in a corresponding control cycle.

Since the interrupt control cycle is decoupled from a PWM signal reference channel cycle, i.e., a time difference between the moment when an interrupt control function is entered and the moment when the AD sampling of the motor driven SVPWM signals is triggered is random, in order to realize better signal synchronization, it is necessary to conduct angle compensation to realize more accurate motor control in specific implementation.

At this time, the frequency of motor control is in line with the frequency of the new interrupt function of the motor. As the interrupt function of the PWM signal reference channel is decoupled from the new interrupt function of motor control, the differences in signal sampling processing are not significant compared with that before decoupling, and the main differences are as follows: when the AD sampling is triggered, sampling results will be carried by DMA to corresponding RAM variables; at this time, values of a STM or TBU module time count register are carried by the software to the RAM variables corresponding to $T_1$ to acquire the time $T_1$ at this time, and the values of the STM or TBU module time count register are read again in the new interrupt function of motor control to acquire the time $T_2$ at this time. When calculating a predicted position of the motor rotor, an angle converted by the software according to the sampled value is the angle $\theta_1$ at the sampling time; when performing motor FOC control in the new interrupt control function, the angle $\theta_2$ at this time is required, and the rotation speed of the motor is $\omega$, so $\theta_2=\theta_1+\omega*(T_2-T_1+n*T)$. The time difference between $T_2$ and $T_1$ of the prediction cycles may not be equal to the time difference between $T_2$ and $T_1$ of the present cycle, but it is believed that the difference is small even if not equal, and will have a very small impact on prediction control. In addition, it is necessary to set time protection when updating six PWM waves output by the motor in the new interrupt control function, i.e., six PWM signals must be updated at the same time; shadow registers are usually set to be disabled to update before the update of the six PWM signals, and after the six PWM signals are set, the shadow registers of the six channels are enabled to update; so that the direct connection of high-side and low-side MOSes caused by updating high-side and low-side shadow registers at different time is avoided, and the update will take effect in the next PWM cycle.

In the solution of the embodiment of the present application, an interrupt function trigger signal is added to realize decoupling from the PWM signals, and the CPU load is reduced by adding an interrupt function scheduling cycle; the CPU load is reduced by breaking a motor control algorithm into four parts and then executing only part of the functions per control cycle. When reducing the CPU load, in order not to affect the control effect of the motor, SVPWM signals of the prediction control will be generated in the fourth control cycle.

In the motor rotation control method of the embodiment of the present application, an interrupt function trigger signal is added to realize decoupling from the PWM signal reference channel, so that SVPWM signal update frequency of motor control will not be affected when CPU load is reduced by adding an interrupt function scheduling cycle.

Embodiment 2

Figure 6:
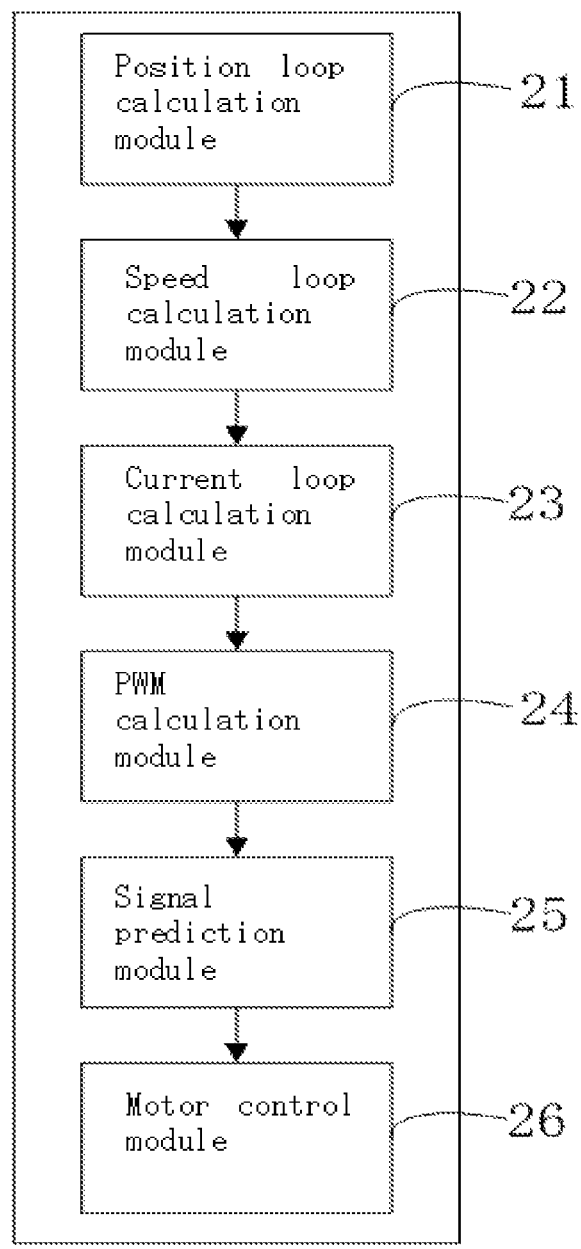
FIG. 6 is a structural schematic diagram of a motor rotation control device provided in an embodiment of the present application.

Referring to FIG. 6, FIG. 6 is a structural schematic diagram of a motor rotation control device disclosed in an embodiment of the present application. As shown in FIG. 6, the motor rotation control device can comprise:

A position loop calculation module 21: used for, in a first interrupt cycle, acquiring first position sampling information of a motor, and conducting position loop calculation to the first position sampling information of the motor to obtain a first control output result;

A speed loop calculation module 22: used for, in a second interrupt cycle, receiving the first control output result obtained from the calculation in the first interrupt cycle, and conducting speed loop calculation to the first control output result to obtain a second control output result;

A current loop calculation module 23: used for, in a third interrupt cycle, receiving the second control output result obtained from the calculation in the second interrupt cycle, and conducting current loop calculation to the second control output result to obtain a third control output result;

A PWM calculation module 24: used for, in a fourth interrupt cycle, receiving the third control output result obtained from the calculation in the third interrupt cycle, and conducting inverse Park transformation and inverse Clark transformation to the third control output result to obtain SVPWM signals of a present cycle; the first interrupt cycle, the second interrupt cycle, the third interrupt cycle and the fourth interrupt cycle constitute an interrupt control cycle, and the interrupt control cycle is decoupled from a PWM signal reference channel; the interrupt control cycle here is a complete motor FOC control cycle;

A signal prediction module 25: used for, in the fourth interrupt cycle, acquiring present second position sampling information of the motor, and predicting the second position sampling information to obtain position result information of a motor rotor in a preset number of predicted cycles; conducting inverse Park transformation and inverse Clark transformation to the position result information to obtain SVPWM signals of the preset number of predicted cycles;

A motor control module 26: used for generating an SVPWM control signal group according to the SVPWM signals of the present cycle and the SVPWM signals of the preset number of predicted cycles, and controlling the motor according to the SVPWM control signal group.

More preferably, priority of the interrupt control cycle is configured to be the highest level for application program class interrupts.

In specific implementation, the priority of the interrupt control cycle is configured to be very high in order not to be disturbed by other interrupts or application program tasks; general interrupts are divided into Class I interrupts and Class II interrupts, whereas the application program class interrupts here are the Class II interrupts, and the Class I interrupts are generally system-level settings; herein, it is only necessary to configure the priority to be the highest level for application program class interrupts to realize corresponding three-closed-loop control disassembly.

In the embodiment of the present application, first, the priority of the interrupt function is set to be very high in order not to be disturbed by other interrupts or Tasks, and then the three-closed-loop control is disassembled, i.e., the motor control is decomposed to be realized in four control cycles, and the interrupt function is entered once in each control cycle. That is, the interrupt function is entered for the first time to realize position loop control, the interrupt function is entered for the second time to realize speed loop control, the interrupt function is entered for the third time to realize current loop control, and the interrupt function is entered for the fourth time to realize generation of a SVPWM control signal sequence with four groups of predicted voltage space vectors, wherein one group is the SVPWM control signals of the present control cycle, and the other three groups are the SVPWM control signals of subsequent three control cycles. The whole control sequence is repeated like this and executed circularly. Each time when an interrupt function is entered, a corresponding group of SVPWM control signals are indexed and updated according to the sequence number of the interrupt function entered, and act on a motor drive bridge circuit. In this way, the SVPWM signal update frequency of motor control will not be affected due to the reduction of the CPU load.

In the motor rotation control method of the embodiment of the present application, an interrupt function trigger signal is added to realize decoupling from the PWM signal reference channel, so that SVPWM signal update frequency of motor control will not be affected when CPU load is reduced by adding an interrupt function scheduling cycle.

Embodiment 3

Figure 7:
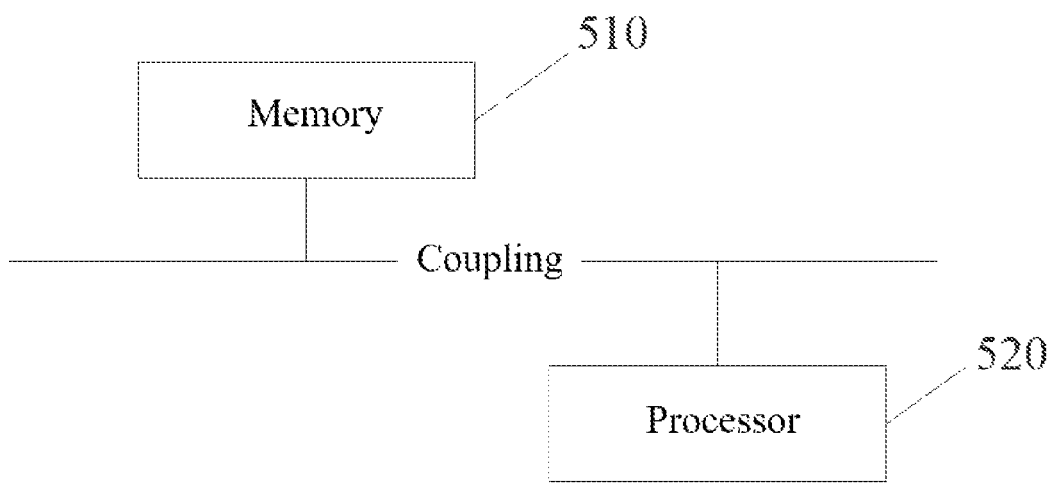
FIG. 7 is a structural schematic diagram of an electronic device provided in an embodiment of the present application.

Referring to FIG. 7, FIG. 7 is a structural schematic diagram of an electronic device disclosed in an embodiment of the present application. The electronic device can be a computer, a server, etc. Of course, in certain cases, the electronic device can also be an intelligent device such as a cellphone, a tablet computer and a monitoring terminal, as well as an image collecting device with a processing function. As shown in FIG. 7, the electronic device can comprise:

A memory 510 which stores executable program codes;

A processor 520 which is coupled to the memory 510;

The executable program codes stored in the memory 510 are invoked by the processor 520 to execute some or all steps in the motor rotation control method in embodiment 1.

The embodiment of the present application discloses a computer readable storage medium, wherein a computer program is stored in the computer readable storage medium, and the computer program enables a computer to execute some or all steps in the motor rotation control method in embodiment 1.

The embodiment of the present application also discloses a computer program product, wherein when the computer program product runs on a computer, the computer is enabled to execute some or all steps in the motor rotation control method in embodiment 1.

The embodiment of the present application also discloses an application publishing platform, wherein the application publishing platform is used for publishing the computer program product, and when the computer program product runs on a computer, the computer is enabled to execute some or all steps in the motor rotation control method in embodiment 1.

In various embodiments of the present application, it should be understood that values of serial numbers of the processes do not imply a necessary execution order, and the execution order of the processes shall be determined by functions and internal logics thereof, and shall not constitute any limitation to the implementation process of the embodiments of the present application.

Units described as separated components may be or may not be separated physically, and components displayed as units may be or may not be physical units, that is, the components can be located at one place or can be distributed on a plurality of network units. The purpose of the solution of the present embodiment can be achieved by selecting some or all units according to actual needs.

In addition, each functional unit in various embodiments of the present application can be integrated in a processing unit, or each unit can physically exist individually, or two or more than two units can be integrated in one unit. The integrated unit can be realized in a form of hardware or can be realized in a form of a software functional unit.

If realized in the form of the software functional unit and sold or used as an independent product, the integrated unit can be stored in a computer accessible memory. Based on such understanding, the technical solutions in the present application can be reflected in a form of a software product in essence or in a part of making a contribution to the prior art. The computer software product is stored in a memory, including several requests to enable one computer device (may be a personal computer, a server or a network device, etc.) to execute some or all steps of the methods of various embodiments of the present application.

In the embodiments provided in the present application, it should be understood that "a B corresponding to an A" indicates that the B is associated with the A, and the B can be determined according to the A. However, it should also be understood that determining the B according the A does not mean that the B is determined according the A only, but that the B can also be determined according the A and/or other information.

Those skilled in the art can understand that some or all steps in various methods of the embodiments can be completed through programs to instruct relevant hardware. The programs can be stored in a computer readable storage medium. The storage medium includes read-only memory (ROM), random access memory (RAM), programmable read-only memory (PROM), erasable programmable read-only memory (EPROM), one-time programmable read-only memory (OTPROM), electrically-erasable programmable read-only memory (EEPROM), compact disc read-only memory (CD-ROM) or other optical disk memory, disk memory, magnetic tape memory, or any other computer readable medium that can be used to carry or store data.

The motor rotation control method, device, electronic device and storage medium disclosed in the embodiments of the present application are described in detail above. Specific individual cases are applied herein for elaborating the principle and embodiments of the present application. The illustration of the above embodiments is merely used for helping to understand the method of the present application and the core thought thereof. Meanwhile, for those ordinary skilled in the art, specific embodiments and the application scope may be changed in accordance with the thought of the present application. In conclusion, the contents of the description shall not be interpreted as a limitation to the present application.

What is claimed is:

1. A motor rotation control method, comprising:
   in a first interrupt cycle, acquiring first position sampling information of a motor, and conducting position loop calculation to the first position sampling information of the motor to obtain a first control output result;
   in a second interrupt cycle, receiving the first control output result obtained from the calculation in the first interrupt cycle, and conducting speed loop calculation to the first control output result to obtain a second control output result;
   in a third interrupt cycle, receiving the second control output result obtained from the calculation in the second interrupt cycle, and conducting current loop calculation to the second control output result to obtain a third control output result;
   in a fourth interrupt cycle, receiving the third control output result obtained from the calculation in the third interrupt cycle, and conducting inverse Park transformation and inverse Clark transformation to the third control output result to obtain SVPWM signals of a present cycle; the first interrupt cycle, the second interrupt cycle, the third interrupt cycle and the fourth interrupt cycle constitute an interrupt control cycle, and the interrupt control cycle is decoupled from a PWM signal reference channel;
   in the fourth interrupt cycle, acquiring present second position sampling information of the motor, and predicting the second position sampling information to obtain position result information of a motor rotor in a preset number of predicted cycles; conducting inverse Park transformation and inverse Clark transformation to the position result information to obtain SVPWM signals of the preset number of predicted cycles;
   generating an SVPWM control signal group according to the SVPWM signals of the present cycle and the SVPWM signals of the preset number of predicted cycles, and controlling the motor according to the SVPWM control signal group.

2. The motor rotation control method according to claim 1, wherein the steps of "acquiring first position sampling information of the motor, and conducting position loop calculation to the first position sampling information of the motor to obtain a first control output result" comprise:

acquiring the position sampling information of the motor in the first interrupt cycle;
processing the position sampling information of the motor in the first interrupt cycle to obtain an actual position of the motor rotor and an actual rotation speed of the motor rotor;
conducting closed-loop control to a position of the motor to obtain the first control output result according to a target position of the motor control input and the actual position of the motor rotor;
the steps of "receiving the first control output result obtained from the calculation in the first interrupt cycle, and conducting speed loop calculation to the first control output result to obtain a second control output result" comprise:
receiving the first control output result and the actual rotation speed of the motor rotor obtained from the calculation in the first interrupt cycle;
conducting closed-loop control calculation to a target speed of the motor to obtain the second control output result;
the steps of "receiving the second control output result obtained from the calculation in the second interrupt cycle, and conducting current loop calculation to the second control output result to obtain a third control output result" comprise:
sampling phase currents of the motor to obtain the phase currents Ia and Ic;
conducting Clark and Park transformation to the phase currents Ia and Ic to obtain a direct-axis (d-axis) current Id and a quadrature-axis (q-axis) current Iq; an electrical angle of a quadrature axis ahead of a direct axis is 90 degrees;
receiving the second control output result obtained from the calculation in the second interrupt cycle, and conducting closed-loop control to the d-axis current Id and the q-axis current Iq to obtain the third control output result;
the steps of "receiving the third control output result obtained from the calculation in the third interrupt cycle, and conducting inverse Park transformation and inverse Clark transformation to the third control output result to obtain SVPWM signals of a present cycle" comprise:
acquiring the position sampling information of the motor in the fourth interrupt cycle;
processing the position sampling information of the motor in the fourth interrupt cycle to obtain an actual position of the motor rotor and a rotation speed of the motor rotor;
receiving the third control output result obtained from the calculation in the third interrupt cycle, and conducting inverse Park transformation and inverse Clark transformation to the third control output result to obtain SVPWM signals of a present cycle;
the steps of "acquiring present second position sampling information of the motor, and predicting the second position sampling information to obtain position result information of a motor rotor in a preset number of predicted cycles; conducting inverse Park transformation and inverse Clark transformation to the position result information to obtain SVPWM signals of the preset number of predicted cycles" comprise:
acquiring the rotation speed and the position of the motor in the fourth interrupt cycle;
predicting the position of the motor rotor in the first interrupt cycle, the position of the motor rotor in the second interrupt cycle and the position of the motor rotor in the third interrupt cycle of a next stage according to the rotation speed and the position of the motor in the fourth interrupt cycle;
conducting inverse Park transformation and inverse Clark transformation to output results in the first interrupt cycle, the second interrupt cycle and the third interrupt cycle of the next stage, respectively, to obtain corresponding SVPWM signals of a position loop, a speed loop and a current loop of the next stage.

3. A computer readable storage medium, wherein a computer program is stored in the computer readable storage medium, and the computer program enables a computer to execute the motor rotation control method in claim 2.

4. The motor rotation control method according to claim 1, wherein the method also comprises the following steps after generating an SVPWM control signal group according to the SVPWM signals of the present cycle and the SVPWM signals of the preset number of predicted cycles:
repeating the above step and generating a corresponding sequence index number for the SVPWM control signal group obtained; storing the corresponding SVPWM control signal group and the sequence index number associatively;
each time a new interrupt control cycle is entered, acquiring the SVPWM control signal group associated with the new interrupt control cycle according to the corresponding sequence index number in order to conduct subsequent motor control.

5. A computer readable storage medium, wherein a computer program is stored in the computer readable storage medium, and the computer program enables a computer to execute the motor rotation control method in claim 4.

6. The motor rotation control method according to claim 1, wherein the motor rotation control method also comprises:
acquiring present load running information of a CPU;
comparing the load running information with a preset load; if the load information is greater than the preset load, increasing the size of the interrupt control cycle until the load running information of the CPU is less than the preset load.

7. A computer readable storage medium, wherein a computer program is stored in the computer readable storage medium, and the computer program enables a computer to execute the motor rotation control method in claim 6.

8. The motor rotation control method according to claim 1, wherein the motor rotation control method also comprises:
acquiring AD signal sampling trigger time T1 and interrupt trigger time T2 by a time acquisition module; the time acquisition module is a STM or TBU module time count register;
acquiring a present rotation speed w of the motor;
calculating predicted position information of the motor rotor according to the AD signal sampling trigger time T1, the interrupt trigger time T2, the present rotation speed $\omega$ and a position compensation formula, and generating SVPWM signals; the position compensation formula is: $\theta 2=\theta 1+\omega*(T2-T1+n*T)$, wherein n is the difference between the number of a control cycle generating predicted PWM signals and the number of a present control cycle, T is the cycle time of motor control, $\omega$ is the present rotation speed of the motor, T2 is the interrupt trigger time, T1 is the AD signal trigger time, $\theta 1$ is the angle calculated after AD sampling at the position of the motor rotor in the current cycle, and θ2 is the position of the motor rotor predicted in a corresponding control cycle.

9. A computer readable storage medium, wherein a computer program is stored in the computer readable storage medium, and the computer program enables a computer to execute the motor rotation control method in claim 8.

10. The motor rotation control method according to claim 1, wherein priority of the interrupt control cycle is configured to be the highest level for application program class interrupts;

and/or the preset number is 3.

11. A computer readable storage medium, wherein a computer program is stored in the computer readable storage medium, and the computer program enables a computer to execute the motor rotation control method in claim 10.

12. A computer readable storage medium, wherein a computer program is stored in the computer readable storage medium, and the computer program enables a computer to execute the motor rotation control method in claim 1.

* * * * *